United States Patent
Krekel et al.

(10) Patent No.: US 10,821,972 B2
(45) Date of Patent: Nov. 3, 2020

(54) VEHICLE REMOTE PARKING ASSIST SYSTEMS AND METHODS

(71) Applicant: Ford Global Technologies, LLC, Dearborn, MI (US)

(72) Inventors: Markus Krekel, Wermelskirchen (DE); Ahmed Benmimoun, Aachen (DE)

(73) Assignee: Ford Global Technologies, LLC, Dearborn, MI (US)

(*) Notice: Subject to any disclaimer, the term of this patent is extended or adjusted under 35 U.S.C. 154(b) by 103 days.

(21) Appl. No.: 16/130,592

(22) Filed: Sep. 13, 2018

(65) Prior Publication Data
US 2020/0086852 A1  Mar. 19, 2020

(51) Int. Cl.
| | |
|---|---|
| *B60W 30/06* | (2006.01) |
| *B60W 50/14* | (2020.01) |
| *G06K 9/00* | (2006.01) |
| *B60W 40/08* | (2012.01) |

(52) U.S. Cl.
CPC ............ *B60W 30/06* (2013.01); *B60W 40/08* (2013.01); *B60W 50/14* (2013.01); *G06K 9/00838* (2013.01); *B60W 2040/0809* (2013.01); *B60W 2050/143* (2013.01)

(58) Field of Classification Search
None
See application file for complete search history.

(56) References Cited

U.S. PATENT DOCUMENTS

| | | | |
|---|---|---|---|
| 5,297,500 A | * | 3/1994 | Wilson .................... E04H 6/426 116/28 R |
| 5,959,724 A | | 9/1999 | Izumi |
| 6,275,754 B1 | | 8/2001 | Shimizu |
| 6,356,828 B1 | | 3/2002 | Shimizu |
| 6,452,617 B1 | | 9/2002 | Bates |
| 6,476,730 B2 | | 11/2002 | Kakinami |
| 6,477,260 B1 | | 11/2002 | Shimomura |
| 6,657,555 B2 | | 12/2003 | Shimizu |
| 6,683,539 B2 | | 1/2004 | Trajkovic |

(Continued)

FOREIGN PATENT DOCUMENTS

| | | |
|---|---|---|
| CN | 101929921 A | 12/2010 |
| CN | 103818204 A | 5/2014 |

(Continued)

OTHER PUBLICATIONS

US 9,772,406 B2, 09/2017, Liu (withdrawn)

(Continued)

*Primary Examiner* — Nicholas K Wiltey
(74) *Attorney, Agent, or Firm* — Frank Lollo; Eversheds Sutherland (US) LLP

(57) ABSTRACT

Vehicles and methods are disclosed for enabling vehicle occupants to maximize their time inside a vehicle during a remote parking operation, so as to limit exposure to adverse weather. An example vehicle includes a door, a sensor, and a processor. The processor is configured to determine a minimum open door angle for an occupant to exit, determine a vehicle path for execution of a remote parking operation, and, responsive to determining via the sensor during execution of the remote parking operation that the door is prevented from opening to the minimum door angle, pause execution of the remote parking operation.

18 Claims, 9 Drawing Sheets

(56) References Cited

U.S. PATENT DOCUMENTS

| | | |
|---|---|---|
| 6,724,322 B2 | 4/2004 | Tang |
| 6,744,364 B2 | 6/2004 | Wathen |
| 6,768,420 B2 | 7/2004 | McCarthy |
| 6,801,855 B1 | 10/2004 | Walters |
| 6,850,844 B1 | 1/2005 | Walters |
| 6,850,148 B2 | 2/2005 | Masudaya |
| 6,927,685 B2 | 8/2005 | Wathen |
| 6,997,048 B2 | 2/2006 | Komatsu |
| 7,042,332 B2 | 5/2006 | Takamura |
| 7,123,167 B2 | 10/2006 | Staniszewski |
| 7,307,655 B1 | 12/2007 | Okamoto |
| 7,663,508 B2 | 2/2010 | Teshima |
| 7,686,378 B2 * | 3/2010 | Gisler .................. E05F 15/43 296/146.4 |
| 7,737,866 B2 | 6/2010 | Wu |
| 7,813,844 B2 | 10/2010 | Gensler |
| 7,825,828 B2 | 11/2010 | Watanabe |
| 7,834,778 B2 | 11/2010 | Browne |
| 7,847,709 B2 | 12/2010 | McCall |
| 7,850,078 B2 | 12/2010 | Christenson |
| 7,924,483 B2 | 4/2011 | Smith |
| 8,035,503 B2 | 10/2011 | Partin |
| 8,054,169 B2 | 11/2011 | Bettecken |
| 8,098,146 B2 | 1/2012 | Petrucelli |
| 8,126,450 B2 | 2/2012 | Howarter |
| 8,164,628 B2 | 4/2012 | Stein |
| 8,180,524 B2 | 5/2012 | Eguchi |
| 8,180,547 B2 | 5/2012 | Prasad |
| 8,224,313 B2 | 7/2012 | Howarter |
| 8,229,645 B2 | 7/2012 | Lee |
| 8,242,884 B2 | 8/2012 | Holcomb |
| 8,335,598 B2 | 12/2012 | Dickerhoof |
| 8,401,235 B2 | 3/2013 | Lee |
| 8,493,236 B2 | 7/2013 | Boehme |
| 8,538,408 B2 | 9/2013 | Howarter |
| 8,542,130 B2 | 9/2013 | Lavoie |
| 8,552,856 B2 | 10/2013 | McRae |
| 8,587,681 B2 | 11/2013 | Guidash |
| 8,594,616 B2 | 11/2013 | Gusikhin |
| 8,599,043 B2 | 12/2013 | Kadowaki |
| 8,618,945 B2 | 12/2013 | Furuta |
| 8,645,015 B2 | 2/2014 | Oetiker |
| 8,655,551 B2 | 2/2014 | Danz |
| 8,692,773 B2 | 4/2014 | You |
| 8,706,350 B2 | 4/2014 | Talty |
| 8,725,315 B2 | 5/2014 | Talty |
| 8,742,947 B2 | 6/2014 | Nakazono |
| 8,744,684 B2 | 6/2014 | Hong |
| 8,780,257 B2 | 7/2014 | Gidon |
| 8,787,868 B2 | 7/2014 | Leblanc |
| 8,825,262 B2 | 9/2014 | Lee |
| 8,868,255 B2 * | 10/2014 | Yoshioka .................. B62D 1/00 340/435 |
| 8,933,778 B2 | 1/2015 | Birkel |
| 8,957,786 B2 | 2/2015 | Stempnik |
| 8,994,548 B2 | 3/2015 | Gaboury |
| 8,995,914 B2 | 3/2015 | Nishidai |
| 9,007,196 B2 * | 4/2015 | Reed .................. E05F 15/43 180/286 |
| 9,008,860 B2 | 4/2015 | Waldock |
| 9,014,920 B1 | 4/2015 | Torres |
| 9,078,200 B2 | 7/2015 | Wuergler |
| 9,086,879 B2 | 7/2015 | Gautama |
| 9,141,503 B1 | 9/2015 | Chen |
| 9,147,065 B2 | 9/2015 | Lauer |
| 9,154,920 B2 | 10/2015 | O'Brien |
| 9,168,955 B2 | 10/2015 | Noh |
| 9,193,387 B2 | 11/2015 | Auer |
| 9,225,531 B2 | 12/2015 | Hachey |
| 9,230,439 B2 | 1/2016 | Boulay |
| 9,233,710 B2 | 1/2016 | Lavoie |
| 9,273,966 B2 | 3/2016 | Bartels |
| 9,275,208 B2 | 3/2016 | Protopapas |
| 9,283,960 B1 | 3/2016 | Lavoie |
| 9,286,803 B2 | 3/2016 | Tippelhofer |
| 9,302,675 B2 | 4/2016 | Schilling |
| 9,318,022 B2 | 4/2016 | Barth |
| 9,379,567 B2 | 6/2016 | Kracker |
| 9,381,859 B2 | 7/2016 | Nagata |
| 9,429,657 B2 | 8/2016 | Sidhu |
| 9,429,947 B1 | 8/2016 | Wengreen |
| 9,454,251 B1 | 9/2016 | Guihot |
| 9,469,247 B2 | 10/2016 | Juneja |
| 9,493,187 B2 | 11/2016 | Pilutti |
| 9,506,774 B2 | 11/2016 | Shutko |
| 9,511,799 B2 | 12/2016 | Lavoie |
| 9,522,675 B1 | 12/2016 | You |
| 9,529,519 B2 | 12/2016 | Blumenberg |
| 9,557,741 B1 | 1/2017 | Elie |
| 9,563,990 B2 | 2/2017 | Khan |
| 9,595,145 B2 | 3/2017 | Avery |
| 9,598,051 B2 | 3/2017 | Okada |
| 9,606,241 B2 | 3/2017 | Varoglu |
| 9,616,923 B2 | 4/2017 | Lavoie |
| 9,637,117 B1 | 5/2017 | Gusikhin |
| 9,651,655 B2 | 5/2017 | Feldman |
| 9,656,690 B2 | 5/2017 | Shen |
| 9,666,040 B2 | 5/2017 | Flaherty |
| 9,688,306 B2 | 6/2017 | McClain |
| 9,701,280 B2 | 7/2017 | Schussmann |
| 9,712,977 B2 | 7/2017 | Tu |
| 9,715,816 B1 | 7/2017 | Adler |
| 9,725,069 B2 | 8/2017 | Krishnan |
| 9,731,714 B2 | 8/2017 | Kiriya |
| 9,731,764 B2 | 8/2017 | Baek |
| 9,754,173 B2 | 9/2017 | Kim |
| 9,809,218 B2 | 11/2017 | Elie |
| 9,811,085 B1 | 11/2017 | Hayes |
| 9,842,444 B2 | 12/2017 | Van Wiemeersch |
| 9,845,070 B2 | 12/2017 | Petel |
| 9,846,431 B2 | 12/2017 | Petel |
| 9,914,333 B2 | 3/2018 | Shank |
| 9,921,743 B2 | 3/2018 | Bryant |
| 9,946,255 B2 | 4/2018 | Matters |
| 9,959,763 B2 | 5/2018 | Miller |
| 9,971,130 B1 | 5/2018 | Lin |
| 9,975,504 B2 | 5/2018 | Dalke |
| 10,019,001 B2 | 7/2018 | Dang Van Nhan |
| 10,032,276 B1 | 7/2018 | Liu |
| 10,040,482 B1 | 8/2018 | Jung |
| 10,043,076 B1 | 8/2018 | Zhang |
| 10,081,390 B1 * | 9/2018 | Anderson ............ B62D 15/028 |
| 10,131,347 B2 | 11/2018 | Kim |
| 10,192,113 B1 | 1/2019 | Liu |
| 10,246,055 B2 | 4/2019 | Farges |
| 10,268,341 B2 | 4/2019 | Kocienda |
| 2002/0157889 A1 * | 10/2002 | Mackle .................. B62D 1/00 180/204 |
| 2003/0060972 A1 | 3/2003 | Kakinami |
| 2003/0098792 A1 | 5/2003 | Edwards |
| 2003/0133027 A1 | 7/2003 | Itoh |
| 2005/0030156 A1 | 2/2005 | Alfonso |
| 2005/0068450 A1 | 3/2005 | Steinberg |
| 2005/0099275 A1 | 5/2005 | Kamdar |
| 2005/0270177 A1 * | 12/2005 | Mori .................. B60T 7/12 340/932.2 |
| 2006/0010961 A1 | 1/2006 | Gibson |
| 2006/0136109 A1 * | 6/2006 | Tanaka .................. B60W 40/04 701/41 |
| 2006/0227010 A1 | 10/2006 | Berstis |
| 2006/0235590 A1 | 10/2006 | Bolourchi |
| 2007/0230944 A1 | 10/2007 | Georgiev |
| 2007/0266635 A1 * | 11/2007 | Sugiura .................. E05F 15/632 49/27 |
| 2008/0027591 A1 | 1/2008 | Lenser |
| 2008/0154464 A1 | 6/2008 | Sasajima |
| 2008/0154613 A1 | 6/2008 | Haulick |
| 2008/0238643 A1 | 10/2008 | Malen |
| 2008/0306683 A1 | 12/2008 | Ando |
| 2009/0096753 A1 | 4/2009 | Lim |
| 2009/0098907 A1 | 4/2009 | Huntzicker |
| 2009/0115639 A1 | 5/2009 | Proefke |
| 2009/0125181 A1 | 5/2009 | Luke |
| 2009/0125311 A1 | 5/2009 | Haulick |

(56) References Cited

U.S. PATENT DOCUMENTS

| | | | |
|---|---|---|---|
| 2009/0128315 A1 | 5/2009 | Griesser | |
| 2009/0146813 A1 | 6/2009 | Nuno | |
| 2009/0174574 A1 | 7/2009 | Endo | |
| 2009/0241031 A1 | 9/2009 | Gamaley | |
| 2009/0248257 A1* | 10/2009 | Hoshino | B60N 2/002 701/49 |
| 2009/0289813 A1 | 11/2009 | Kwiecinski | |
| 2009/0309970 A1 | 12/2009 | Ishii | |
| 2009/0313095 A1 | 12/2009 | Hurpin | |
| 2010/0025942 A1 | 2/2010 | Mangaroo | |
| 2010/0033348 A1* | 2/2010 | Kawabata | B60R 1/00 340/932.2 |
| 2010/0061564 A1 | 3/2010 | Clemow | |
| 2010/0076651 A1* | 3/2010 | Nakakura | G01S 17/42 701/49 |
| 2010/0114471 A1 | 5/2010 | Sugiyama | |
| 2010/0114488 A1 | 5/2010 | Khamharn | |
| 2010/0136944 A1 | 6/2010 | Taylor | |
| 2010/0145617 A1* | 6/2010 | Okada | B60R 1/12 701/300 |
| 2010/0152972 A1 | 6/2010 | Attard | |
| 2010/0156672 A1 | 6/2010 | Yoo | |
| 2010/0228448 A1* | 9/2010 | Nakakura | E05F 15/43 701/49 |
| 2010/0245277 A1 | 9/2010 | Nakao | |
| 2010/0259420 A1 | 10/2010 | Von Rehyer | |
| 2010/0274414 A1* | 10/2010 | Park | B60W 30/06 701/2 |
| 2011/0071725 A1 | 3/2011 | Kleve | |
| 2011/0080304 A1* | 4/2011 | Toledo | B62D 15/027 340/932.2 |
| 2011/0082613 A1* | 4/2011 | Oetiker | B60W 10/20 701/25 |
| 2011/0175752 A1* | 7/2011 | Augst | B60R 1/00 340/905 |
| 2011/0190972 A1 | 8/2011 | Timmons | |
| 2011/0205088 A1 | 8/2011 | Baker | |
| 2011/0253463 A1 | 10/2011 | Smith | |
| 2011/0285848 A1* | 11/2011 | Han | B60R 1/00 348/148 |
| 2011/0295469 A1* | 12/2011 | Rafii | E05F 15/43 701/49 |
| 2011/0309922 A1* | 12/2011 | Ghabra | B60R 25/24 340/426.36 |
| 2012/0007741 A1 | 1/2012 | Laffey | |
| 2012/0056734 A1* | 3/2012 | Ikeda | G08G 1/165 340/425.5 |
| 2012/0072067 A1 | 3/2012 | Jecker | |
| 2012/0083960 A1 | 4/2012 | Zhu | |
| 2012/0173080 A1 | 7/2012 | Cluff | |
| 2012/0176332 A1 | 7/2012 | Fujibayashi | |
| 2012/0191284 A1* | 7/2012 | Fehse | B62D 15/0275 701/23 |
| 2012/0271500 A1 | 10/2012 | Tsimhoni | |
| 2012/0303258 A1 | 11/2012 | Pampus | |
| 2012/0316704 A1* | 12/2012 | Ohbayashi | B60R 25/04 701/2 |
| 2012/0323643 A1 | 12/2012 | Volz | |
| 2012/0323700 A1 | 12/2012 | Aleksandrovich | |
| 2013/0021171 A1 | 1/2013 | Hsu | |
| 2013/0024202 A1 | 1/2013 | Harris | |
| 2013/0043989 A1 | 2/2013 | Niemz | |
| 2013/0073119 A1 | 3/2013 | Huger | |
| 2013/0085975 A1* | 4/2013 | Wellhoefer | B60R 21/0134 706/46 |
| 2013/0109342 A1 | 5/2013 | Welch | |
| 2013/0110342 A1 | 5/2013 | Wuttke | |
| 2013/0113614 A1* | 5/2013 | Yopp | B60Q 9/00 340/438 |
| 2013/0113936 A1 | 5/2013 | Cohen | |
| 2013/0124061 A1 | 5/2013 | Khanafer | |
| 2013/0145441 A1 | 6/2013 | Mujumdar | |
| 2013/0166190 A1* | 6/2013 | Ikeda | B60R 1/00 701/400 |
| 2013/0211623 A1 | 8/2013 | Thompson | |
| 2013/0231824 A1 | 9/2013 | Wilson | |
| 2013/0289825 A1 | 10/2013 | Noh | |
| 2013/0314502 A1 | 11/2013 | Urbach | |
| 2013/0317944 A1 | 11/2013 | Huang | |
| 2014/0052323 A1 | 2/2014 | Reichel | |
| 2014/0088836 A1* | 3/2014 | Staack | B60R 1/025 701/49 |
| 2014/0095994 A1 | 4/2014 | Kim | |
| 2014/0096051 A1 | 4/2014 | Boblett | |
| 2014/0121930 A1 | 5/2014 | Allexi | |
| 2014/0147032 A1 | 5/2014 | Yous | |
| 2014/0156107 A1 | 6/2014 | Karasawa | |
| 2014/0188339 A1 | 7/2014 | Moon | |
| 2014/0197939 A1* | 7/2014 | Stefan | B60W 30/0956 340/435 |
| 2014/0222252 A1* | 8/2014 | Matters | B62D 15/027 701/2 |
| 2014/0236461 A1* | 8/2014 | Edgren | F02N 15/00 701/113 |
| 2014/0240502 A1 | 8/2014 | Strauss | |
| 2014/0282931 A1 | 9/2014 | Protopapas | |
| 2014/0297120 A1 | 10/2014 | Cotgrove | |
| 2014/0300504 A1 | 10/2014 | Shaffer | |
| 2014/0303839 A1 | 10/2014 | Filev | |
| 2014/0320318 A1 | 10/2014 | Victor | |
| 2014/0327736 A1 | 11/2014 | DeJohn | |
| 2014/0350804 A1 | 11/2014 | Park | |
| 2014/0350855 A1 | 11/2014 | Vishnuvajhala | |
| 2014/0365108 A1 | 12/2014 | You | |
| 2014/0365126 A1 | 12/2014 | Vulcano | |
| 2015/0022468 A1 | 1/2015 | Cha | |
| 2015/0039173 A1 | 2/2015 | Beaurepaire | |
| 2015/0039224 A1 | 2/2015 | Tuukkanen | |
| 2015/0048927 A1 | 2/2015 | Simmons | |
| 2015/0066545 A1 | 3/2015 | Kotecha | |
| 2015/0073666 A1* | 3/2015 | Dotterweich | E05F 15/79 701/49 |
| 2015/0077522 A1 | 3/2015 | Suzuki | |
| 2015/0088360 A1 | 3/2015 | Bonnet | |
| 2015/0091741 A1 | 4/2015 | Stefik | |
| 2015/0109116 A1 | 4/2015 | Grimm | |
| 2015/0116079 A1 | 4/2015 | Mishra | |
| 2015/0123818 A1 | 5/2015 | Sellschopp | |
| 2015/0127208 A1 | 5/2015 | Jecker | |
| 2015/0149265 A1 | 5/2015 | Huntzicker | |
| 2015/0197278 A1 | 7/2015 | Boos | |
| 2015/0203156 A1 | 7/2015 | Hafner | |
| 2015/0210317 A1 | 7/2015 | Hafner | |
| 2015/0217693 A1 | 8/2015 | Pliefke | |
| 2015/0329110 A1* | 11/2015 | Stefan | B62D 15/0285 701/1 |
| 2015/0344028 A1* | 12/2015 | Gieseke | B62D 15/028 701/1 |
| 2015/0365401 A1 | 12/2015 | Brown | |
| 2015/0375741 A1* | 12/2015 | Kiriya | G05D 1/0011 701/2 |
| 2016/0012653 A1 | 1/2016 | Soroka | |
| 2016/0153778 A1 | 2/2016 | Singh | |
| 2016/0068158 A1 | 3/2016 | Elwart | |
| 2016/0107690 A1* | 4/2016 | Oyama | B62D 15/0285 701/41 |
| 2016/0152263 A1 | 6/2016 | Singh | |
| 2016/0170494 A1 | 6/2016 | Bonnet | |
| 2016/0185389 A1* | 6/2016 | Ishijima | B62D 15/0285 701/41 |
| 2016/0189435 A1 | 6/2016 | Beaurepaire | |
| 2016/0207528 A1 | 7/2016 | Stefan | |
| 2016/0224025 A1 | 8/2016 | Petel | |
| 2016/0229452 A1 | 8/2016 | Lavoie | |
| 2016/0236680 A1 | 8/2016 | Lavoie | |
| 2016/0249294 A1 | 8/2016 | Lee | |
| 2016/0257304 A1 | 9/2016 | Lavoie | |
| 2016/0272244 A1 | 9/2016 | Imai | |
| 2016/0282442 A1 | 9/2016 | O'Mahony | |
| 2016/0284217 A1* | 9/2016 | Lee | B62D 15/0285 |

(56) References Cited

U.S. PATENT DOCUMENTS

| | | |
|---|---|---|
| 2016/0288657 A1 | 10/2016 | Tokura |
| 2016/0300417 A1 | 10/2016 | Hatton |
| 2016/0304087 A1 | 10/2016 | Noh |
| 2016/0304088 A1 | 10/2016 | Barth |
| 2016/0349362 A1 | 10/2016 | Rohr |
| 2016/0321445 A1 | 11/2016 | Turgeman |
| 2016/0321926 A1 | 11/2016 | Mayer |
| 2016/0334797 A1 | 11/2016 | Ross |
| 2016/0347280 A1 | 12/2016 | Daman |
| 2016/0355125 A1 | 12/2016 | Herbert |
| 2016/0357354 A1 | 12/2016 | Chen |
| 2016/0358474 A1 | 12/2016 | Uppal |
| 2016/0368489 A1 | 12/2016 | Aich |
| 2016/0371607 A1 | 12/2016 | Rosen |
| 2016/0371691 A1 | 12/2016 | Kang |
| 2017/0001650 A1 | 1/2017 | Park |
| 2017/0008563 A1 | 1/2017 | Popken |
| 2017/0026198 A1 | 1/2017 | Ochiai |
| 2017/0028985 A1 | 2/2017 | Kiyokawa |
| 2017/0030722 A1 | 2/2017 | Kojo |
| 2017/0032593 A1 | 2/2017 | Patel |
| 2017/0072947 A1 | 3/2017 | Lavoie |
| 2017/0073004 A1 | 3/2017 | Shepard |
| 2017/0076603 A1 | 3/2017 | Bostick |
| 2017/0097504 A1 | 4/2017 | Takamatsu |
| 2017/0116790 A1 | 4/2017 | Kusens |
| 2017/0123423 A1 | 5/2017 | Sako |
| 2017/0129537 A1 | 5/2017 | Kim |
| 2017/0129538 A1 | 5/2017 | Stefan |
| 2017/0132482 A1 | 5/2017 | Kim |
| 2017/0144654 A1 | 5/2017 | Sham |
| 2017/0144656 A1 | 5/2017 | Kim |
| 2017/0147995 A1 | 5/2017 | Kalimi |
| 2017/0168479 A1 | 6/2017 | Dang |
| 2017/0192428 A1 | 7/2017 | Vogt |
| 2017/0200336 A1* | 7/2017 | Schmidt ................ G08C 17/02 |
| 2017/0200369 A1 | 7/2017 | Miller |
| 2017/0203763 A1 | 7/2017 | Yamada |
| 2017/0208438 A1 | 7/2017 | Dickow |
| 2017/0297385 A1 | 10/2017 | Kim |
| 2017/0297620 A1 | 10/2017 | Lavoie |
| 2017/0301241 A1 | 10/2017 | Urhahne |
| 2017/0308075 A1 | 10/2017 | Whitaker |
| 2017/0334353 A1* | 11/2017 | Gillott ................ B62D 15/0285 |
| 2017/0336788 A1 | 11/2017 | Iagnemma |
| 2017/0357317 A1 | 12/2017 | Chaudhri |
| 2017/0371514 A1 | 12/2017 | Cullin |
| 2018/0015878 A1 | 1/2018 | McNew |
| 2018/0024559 A1 | 1/2018 | Seo et al. |
| 2018/0029591 A1 | 2/2018 | Lavoie |
| 2018/0029641 A1 | 2/2018 | Solar |
| 2018/0039264 A1 | 2/2018 | Messner |
| 2018/0043884 A1 | 2/2018 | Johnson |
| 2018/0056939 A1 | 3/2018 | van Roermund |
| 2018/0056989 A1 | 3/2018 | Donald |
| 2018/0082588 A1 | 3/2018 | Hoffman, Jr. |
| 2018/0088330 A1 | 3/2018 | Giannuzzi |
| 2018/0093663 A1 | 4/2018 | Kim |
| 2018/0105165 A1 | 4/2018 | Alarcon |
| 2018/0105167 A1 | 4/2018 | Kim |
| 2018/0148094 A1 | 5/2018 | Mukaiyama |
| 2018/0174460 A1 | 6/2018 | Jung |
| 2018/0189971 A1 | 7/2018 | Hildreth |
| 2018/0194344 A1 | 7/2018 | Wang |
| 2018/0196963 A1 | 7/2018 | Bandiwdekar |
| 2018/0224863 A1 | 8/2018 | Fu |
| 2018/0236957 A1 | 8/2018 | Min |
| 2018/0284802 A1 | 10/2018 | Tsai |
| 2018/0286072 A1 | 10/2018 | Tsai |
| 2018/0339654 A1 | 11/2018 | Kim |
| 2018/0345851 A1 | 12/2018 | Lavoie |
| 2018/0364731 A1 | 12/2018 | Liu |
| 2019/0005445 A1 | 1/2019 | Bahrainwala |
| 2019/0042003 A1 | 2/2019 | Parazynski |
| 2019/0066503 A1 | 2/2019 | Li |
| 2019/0100950 A1* | 4/2019 | Aravkin ................ G08G 1/168 |
| 2019/0103027 A1 | 4/2019 | Wheeler |
| 2019/0126779 A1* | 5/2019 | Saitou ................ G01V 3/12 |
| 2019/0137990 A1 | 5/2019 | Golgiri |

FOREIGN PATENT DOCUMENTS

| | | |
|---|---|---|
| CN | 104183153 A | 12/2014 |
| CN | 104485013 A | 4/2015 |
| CN | 104691544 A | 6/2015 |
| CN | 103049159 B | 7/2015 |
| CN | 105513412 A | 4/2016 |
| CN | 105588563 A | 5/2016 |
| CN | 105599703 A | 5/2016 |
| CN | 105774691 A | 7/2016 |
| CN | 106027749 A | 10/2016 |
| CN | 205719000 U | 11/2016 |
| CN | 106598630 A | 4/2017 |
| CN | 106782572 A | 5/2017 |
| CN | 106945662 A | 7/2017 |
| CN | 104290751 B | 1/2018 |
| DE | 3844340 A1 | 7/1990 |
| DE | 19817142 A1 | 10/1999 |
| DE | 19821163 A1 | 11/1999 |
| DE | 102005006966 A1 | 9/2005 |
| DE | 102006058213 A1 | 7/2008 |
| DE | 102009024083 A1 | 7/2010 |
| DE | 102016224529 A1 | 3/2011 |
| DE | 102016226008 A1 | 3/2011 |
| DE | 102012008858 A1 | 11/2012 |
| DE | 102009060169 A1 | 6/2013 |
| DE | 102011080148 A1 | 7/2013 |
| DE | 102012200725 A1 | 9/2013 |
| DE | 102009051055 A1 | 10/2013 |
| DE | 102011122421 A1 | 6/2014 |
| DE | 102012008858 A1 | 6/2014 |
| DE | 102013016342 A1 | 1/2015 |
| DE | 102013019904 A1 | 2/2015 |
| DE | 102012215218 A1 | 4/2015 |
| DE | 102012222972 A1 | 5/2015 |
| DE | 102013004214 A1 | 5/2015 |
| DE | 102013019771 A1 | 12/2015 |
| DE | 102013213064 A1 | 2/2016 |
| DE | 102014007915 A1 | 2/2016 |
| DE | 102014011802 A1 | 2/2016 |
| DE | 102014009077 A1 | 4/2016 |
| DE | 102014226458 A1 | 6/2016 |
| DE | 102014011864 A1 | 12/2016 |
| DE | 102014015655 A1 | 5/2017 |
| DE | 102014111570 A1 | 6/2017 |
| DE | 102016214433 A1 | 6/2017 |
| DE | 102015209976 A1 | 7/2017 |
| DE | 102015221224 A1 | 12/2017 |
| DE | 102016011916 A1 | 2/2018 |
| DE | 102016125282 A1 | 6/2018 |
| DE | 102016211021 A1 | 6/2018 |
| EP | 2653367 A1 | 6/2000 |
| EP | 2768718 B1 | 6/2011 |
| EP | 2289768 A2 | 10/2013 |
| EP | 2620351 B1 | 12/2015 |
| EP | 2295281 A1 | 3/2016 |
| EP | 2135788 B1 | 6/2016 |
| FR | 3021798 A1 | 12/2012 |
| GB | 2534471 A | 10/2000 |
| GB | 2344481 A | 12/2012 |
| GB | 2497836 A | 9/2014 |
| GB | 2481324 A | 3/2015 |
| GB | 2517835 A | 5/2016 |
| GB | 2491720 A | 7/2016 |
| JP | 5586450 B2 | 5/2004 |
| JP | 5918683 B2 | 10/2004 |
| JP | 2000293797 A | 7/2005 |
| JP | 2004142543 A | 4/2009 |
| JP | 2016119032 A | 4/2009 |
| JP | 2018052188 A | 1/2010 |
| JP | 2004287884 A | 7/2014 |
| JP | 2005193742 A | 7/2014 |
| JP | 2009090850 A | 6/2016 |
| JP | 2014134082 A | 7/2016 |

(56) References Cited

FOREIGN PATENT DOCUMENTS

| | | |
|---|---|---|
| JP | 2014125196 A | 4/2018 |
| KR | 20130106005 A | 6/2006 |
| KR | 20160039460 A | 5/2008 |
| KR | 20160051993 A | 1/2010 |
| KR | 101641267 B | 9/2013 |
| KR | 20090040024 A | 4/2016 |
| KR | 20100006714 A | 5/2016 |
| WO | WO 2017/112444 A1 | 12/2010 |
| WO | WO 2017/118510 A1 | 6/2011 |
| WO | WO 2006/064544 A1 | 11/2011 |
| WO | WO 2017/125514 A1 | 1/2013 |
| WO | WO 2008/055567 A1 | 4/2013 |
| WO | WO 2010/006981 A1 | 8/2013 |
| WO | WO 2011/141096 A1 | 7/2014 |
| WO | WO 2013/056959 A1 | 5/2015 |
| WO | WO 2013/123813 A1 | 12/2015 |
| WO | WO 2014/103492 A1 | 3/2016 |
| WO | WO 2015/068032 A1 | 8/2016 |
| WO | WO 2015/193058 A1 | 9/2016 |
| WO | WO 2016/046269 A1 | 4/2017 |
| WO | WO 2016/128200 A1 | 5/2017 |
| WO | WO 2016/134822 A1 | 6/2017 |
| WO | WO 2017/062448 A1 | 6/2017 |
| WO | WO 2017/073159 A1 | 6/2017 |
| WO | WO 2017/096307 A1 | 6/2017 |
| WO | WO 2017/096728 A1 | 7/2017 |
| WO | WO 2017/097942 A1 | 7/2017 |

OTHER PUBLICATIONS

Alberto Broggi and Elena Cardarelli, Vehicle Detection for Autonomous Parking Using a Soft-Cascade ADA Boost Classifier, Jun. 8, 2014.
Al-Sherbaz, Ali et al., Hybridisation of GNSS with other wireless/sensors technologies on board smartphones to offer seamless outdoors-indoors positioning for LBS applications, Apr. 2016, 3 pages.
Automatically Into the Parking Space—https://www.mercedes-benz.com/en/mercedes-benz/next/automation/automatically-into-the-parking-space/; Oct. 27, 2014.
Bill Howard, Bosch's View of the Future Car: Truly Keyless Entry, Haptic Feedback, Smart Parking, Cybersecurity, Jan. 9, 2017, 8 Pages.
ChargeItSpot Locations, Find a Phone Charging Station Near You, retrieved at https://chargeitspot.com/locations/ on Nov. 28, 2017.
Core System Requirements Specification (SyRS), Jun. 30, 2011, Research and Innovative Technology Administration.
Daimler AG, Remote Parking Pilot, Mar. 2016 (3 Pages).
Jingbin Liu, IParking: An Intelligent Indoor Location-Based Smartphone Parking Service, Oct. 31, 2012, 15 pages.
Land Rover develops a smartphone remote control for its SUVs, James Vincent, Jun. 18, 2015.
Land Rover, Land Rover Remote Control via Iphone RC Range Rover Sport Showcase—Autogefühl, Retrieved from https://www.youtube.com/watch?v=4ZaaYNaEFio (at 43 seconds and 1 minute 42 seconds), Sep. 16, 2015.
Perpendicular Parking—https://prezi.com/toqmfyxriksl/perpendicular-parking/.
SafeCharge, Secure Cell Phone Charging Stations & Lockers, retrieved at https://www.thesafecharge.com on Nov. 28, 2017.
Search Report dated Jan. 19, 2018 for GB Patent Application No. 1711988.4 (3 pages).
Search Report dated Jul. 11, 2017 for GB Patent Application No. 1700447.4 (3 Pages).
Search Report dated May 21, 2018 for Great Britain Patent Application No. GB 1800277.4 (5 Pages).
Search Report dated Nov. 22, 2018 for GB Patent Application No. GB 1809829.3 (6 pages).
Search Report dated Nov. 27, 2018 for GB Patent Application No. GB 1809112.4 (3 pages).
Search Report dated Nov. 28, 2017, for GB Patent Application No. GB 1710916.6 (4 Pages).
Search Report dated Nov. 28, 2018 for GB Patent Application No. GB 1809842.6 (5 pages).
Search Report dated Oct. 10, 2018 for GB Patent Application No. 1806499.8 (4 pages).
Tesla Model S Owner's Manual v2018.44. Oct. 29, 2018.
Vehicle'S Orientation Measurement Method by Single-Camera Image Using Known-Shaped Planar Object, Nozomu Araki, Takao Sato, Yasuo Konishi and Hiroyuki Ishigaki, 2010.

* cited by examiner

VEHICLE REMOTE PARKING ASSIST SYSTEMS AND METHODS

TECHNICAL FIELD

The present disclosure generally relates to vehicle remote parking assistance, and, more specifically, systems and methods to maximize occupant's time spent in the vehicle during a remote parking operation into a narrow parking space.

BACKGROUND

Modern vehicles may include the ability to remotely drive themselves with no or only minor control instruction from the user. Some vehicles may even be able to park themselves while an owner or driver watches from either inside or outside the vehicle and provides no or minimal motion control instruction. In these instances, the driver may initiate the remote parking operation, and the vehicle may proceed to position the vehicle in a parking spot using vehicle sensors.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown enabling a driver and other occupants of a vehicle to remain in the vehicle during a remote parking operation executed by the vehicle into a narrow parking spot. An example disclosed vehicle includes a door, a sensor, and a processor. The processor is configured to determine a minimum open door angle for an occupant to exit, determine a vehicle path for execution of a remote parking operation, and responsive to determining via the sensor during execution of the remote parking operation that the door is prevented from opening to the minimum door angle, pause execution of the remote parking operation.

An example disclosed method includes determining a minimum open door angle of a door for an occupant to exit a vehicle. The method also includes determining a vehicle path for execution of a remote parking operation. And the method further includes, responsive to determining via a sensor during execution of the remote parking operation that the door is prevented from opening to the minimum open door angle, pausing execution of the remote parking operation.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1A:
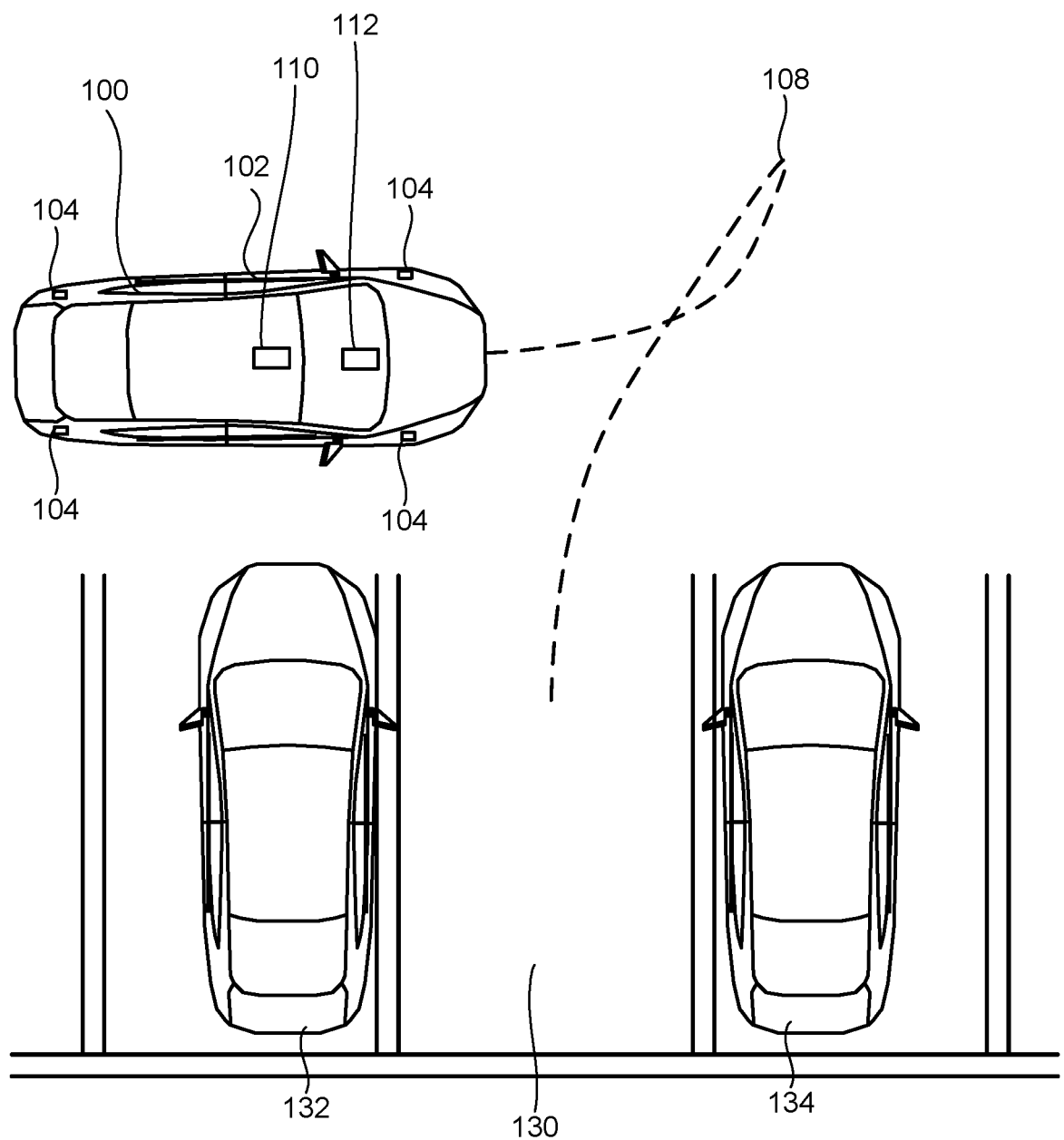
FIGS. 1A-1C illustrate an example vehicle having a single occupant and performing a remote parking operation according to embodiments of the present disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As noted above, embodiments herein are directed to vehicles, systems, and methods for providing occupants of a vehicle a maximum amount of time inside the vehicle when executing a remote parking operation into a narrow parking spot. In some scenarios in which there is rain, snow, cold temperatures, or other inclement weather, the driver and/or other occupants may wish to stay inside the vehicle as long as possible to avoid waiting outside the vehicle for the full remote parking operation to be carried out.

However, if the parking spot into which the vehicle is going to be parked is narrow, one or more doors of the vehicle may not be able to open to a sufficient distance for the driver and/or passengers to exit once parked. Embodiments disclosed herein may enable a driver and/or passengers to remain in the vehicle during the early stages of the remote parking operation. As the vehicle enters the parking space, the vehicle may determine the position of the vehicle and/or the environment to determine the last possible moment at which one or more vehicle doors can be opened safely and to a given open door angle. The vehicle may then pause to allow the occupant to exit through the door, and resume execution of the remote parking operation after the door has been closed and/or a continue command has been received.

In order to provide this functionality to the driver and/or other vehicle occupants, the process may first include the driver starting an automated remote parking operation or maneuver. In some cases the vehicle may evaluate whether the intended parking spot is narrow and/or whether an end position of the vehicle when parked will result in one or more of the doors being prevented from opening. In some examples the vehicle operator may input which door(s) correspond to occupied vehicle seats, and thus which doors should be considered when performing the remote parking operation. Each door may have an associated open door angle, which corresponds to the angle at which the door should be opened to safely and comfortably allow the occupant to exit the vehicle. These angles can be default angles, or may be adjusted by the occupant or vehicle operator via one or more inputs.

As the vehicle executes the remote parking operation into the narrow parking spot, the vehicle may continuously monitor the position of the vehicle (and/or various components of the vehicle) with respect to the environment, including any adjacent vehicles or obstacles that cause the intended parking spot to be narrow. The vehicle may also project a position of the door(s) of the vehicle when opened to their corresponding open door angles, so as to determine the moment when the doors are no longer able to open. The vehicle may then stop execution of the remote parking operation (either at that point, or shortly before or after). The occupant may then open the door, exit the vehicle, and close the door. The vehicle may then proceed with executing the remote parking operation. If a second door was indicated as corresponding to an occupant, the vehicle may continue the remote parking operation by moving the vehicle into the narrow parking spot until the second door is nearly prevented from opening to its corresponding open door angle. The vehicle may then pause execution to allow the occupant to open the door, exit, and close the door. This process may be repeated for each door that is indicated as corresponding to an occupied seat (either by an operators selection, an automatic determination via one or more vehicle sensors, or via some other technique). After the final door has been closed, the vehicle may proceed to finish the remote parking operation by parking the vehicle in the intended parking spot.

Figure 1B:
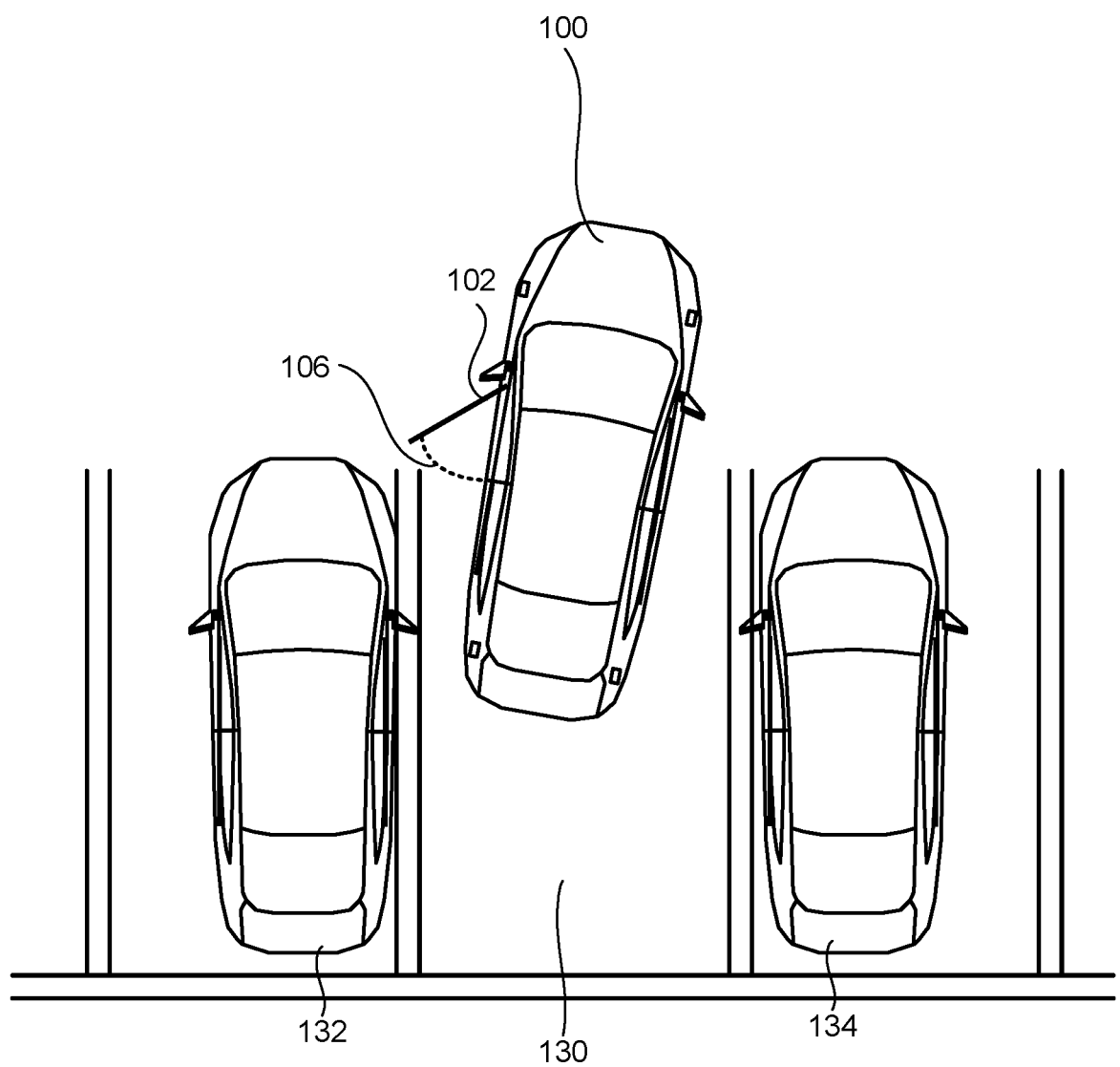
Figure 1C:
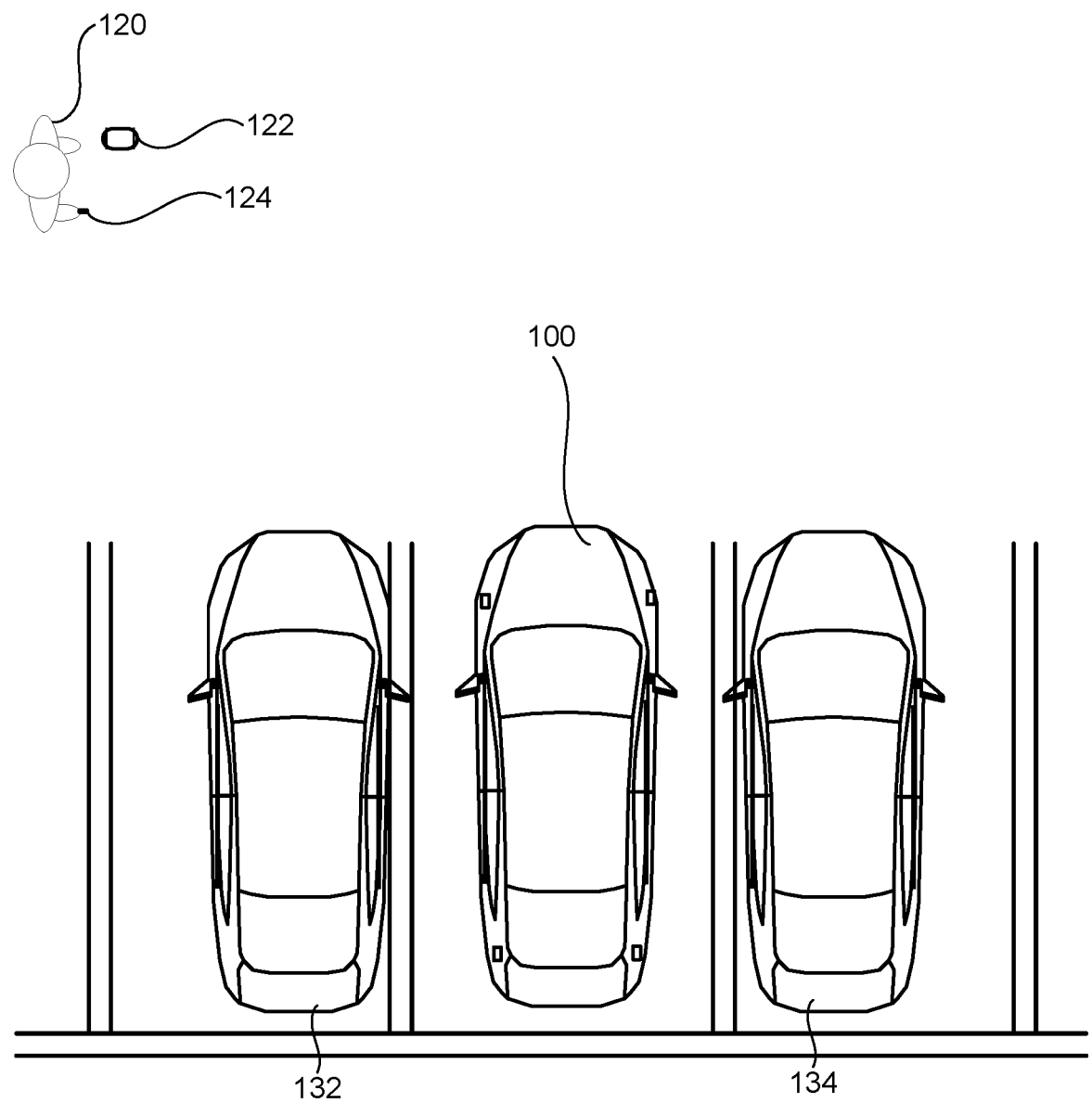

FIGS. 1A-1C illustrate the remote parking operation process described above when only a single operator is present in the vehicle driver's seat. Vehicle 100 may be a standard gasoline powered vehicle, a hybrid vehicle, an electric vehicle, a fuel cell vehicle, or any other mobility implement type of vehicle. Vehicle 100 may be non-autonomous, semi-autonomous, or autonomous. Vehicle 100 includes parts related to mobility, such as a powertrain with an engine, a transmission, a suspension, a driveshaft, and/or wheels, etc. In the illustrated example, vehicle 100 may include one or more electronic components (described below with respect to FIG. 3).

As shown in FIG. 1, vehicle 100 may include one or more components including driver's side front door 102. Vehicle 100 may also include one or more other doors, such as a passenger's side front door, rear door(s), and a trunk or liftgate. Examples disclosed herein are shown with reference to a sedan having four doors and a trunk, however it should be understood that the principles disclosed herein can also apply to other vehicles having other numbers and/or orientations of doors.

Each door may have a particular minimum open door angle, which may refer to the angle at which the door opens to comfortably and safely allow an occupant to exit. This minimum open door angle may be a default value determined or set by a manufacturer, or may be set via input from a user of the vehicle.

In some examples, the minimum open door angle may be determined based on input received by a user via a user interface 112 of vehicle 100. Alternatively, the minimum open door angle may be set by having an operator of the vehicle move the door to a desired open angle, and storing the determined angle as the minimum open door angle for that door.

One or more determinations can be made based on the open door angle, in combination with other values such as the known door length from the pivot point, and other door characteristics. These values can allow the vehicle and/or processor 110 of vehicle 100 to predict a position of the door when opened to the open door angle.

Vehicle 100 may also include one or more sensors 104, which may be positioned at various places in and around vehicle 100. Sensors 104 may be ultrasonic, radar, video, image, or other types of sensors that are configured to determine the location of objects and obstacles in the environment surrounding vehicle 100. Sensors 104 may be used to determine a distance between the vehicle 100 and the objects in environment, including vehicles 132 and 134 in parking spots adjacent to the intended parking spot 130 of FIGS. 1A-1C.

Information from the sensors may be combined with or used in connection with known door characteristics, such as the door length and shape, to determine whether or not a door can be opened to a given door angle. For instance, the sensor data may be used in connection with known door characteristics to monitor the sides of the vehicle as the vehicle moves, to continuously determine what angle the door can be opened to without running into objects in the environment. In particular examples, the sensor information may be used to determine whether a given door can be opened to a minimum open door angle or not.

Processor 110 of vehicle 100 may be configured to carry out one or more functions or acts such as those described herein. Processor 110 may be part of on-board computing system 302 described with respect to FIG. 3.

In some examples, processor 110 may be configured to determine the minimum open door angle corresponding to one or more doors, wherein the minimum open door angle is the angle of the door for which an occupant is able to comfortably exit the vehicle. In FIGS. 1A-1C, this may include determining the minimum open door angle of door 102. The open door angle 106 is shown in FIG. 1B.

In some examples, the minimum open door angle may be determined based on a default value (e.g., 45 degrees). This may be defined by the manufacturer, and may depend on the make and model of the vehicle, as well as one or more characteristics of the particular door (front vs back, lift gate, etc.).

The minimum open door angle may also be input by a user via user interface 112. The user can specify a particular angle or other value corresponding to the amount that the door opens to allow the user to exit the vehicle.

Further, the minimum open door angle may be set through actuation of the door itself. The user may manually move the door to a particular open position that is comfortable for the user. The vehicle can then store the current angle of the door as the minimum open door angle corresponding to that door for later use.

In some examples, the minimum open door angle for a given door may be determined based on a detected occupant identity. For instance, the vehicle may store one or more profiles or accounts for various vehicle operators or passengers. A first profile may have a first minimum open door angle corresponding to the driver's side front door, and a second profile may have a second, different, minimum open door angle for the same door.

The processor may determine which particular profile to use based on the detection of a key FOB 124. The driver may have the key FOB in his or her pocket, purse, bag, or otherwise have it nearby. The vehicle can then determine an identity or profile corresponding to the key FOB 124, and responsively determine that the minimum open door angle for the door 102 should be set based on the detected identity.

In some examples, instead of or in addition to using the key FOB 124, one or more internal or external sensors may be used to detect whether a person is present in a given vehicle seat, and an identity corresponding to that person. For instance, an internal camera may be used with facial recognition software to determine the identity of the operator, and match it to a stored profile. Then based on the stored profile, the processor may determine the appropriate minimum open door angle. In addition, pressure sensors or occupancy sensors on the seats, cameras, and other sensors may be used to determine whether one or more other seats are occupied. Each door of vehicle 100 may have the same minimum open door angle, or may have a different open door angle.

Processor 110 may also be configured to determine that a remote parking operation has been initiated. The operation may be initiated via user interface 112, remote computing device 122, or via another source.

The operator of vehicle 100 may select one or more doors of vehicle 100 that correspond to occupied seats. For instance, when starting the remote parking operation the operator may select the front driver's side seat and the rear passenger side seat. Or rather than selecting the occupied seats, the operator may select one or more seats that correspond to doors which the operator of the vehicle wishes to have open to minimum open door angle prior to completing remote parking operation (e.g., if there is a large package in a seat that the operator wishes to remove before the car is fully parked and the door is prevented from opening far enough). The user interface 112 and/or remote computing device 122 may display a graphic showing an overhead view of vehicle 100, and the operator may select the seats and/or doors that should be opened prior to completing the remote parking operation.

Processor 110 may also determine a vehicle path 108 for execution of the remote parking operation. Vehicle path 108 may be a path along which vehicle 100 is intended to travel to enter the intended parking spot 130. The path 108 may be determined based on data gathered by one or more vehicle sensors, such as sensors 104.

In some examples, determining the vehicle path 108 may include determining that the intended parking spot 130 is narrow. This can include determining that one or more vehicle doors may be prevented from fully opening or opening to a minimum open door angle if the vehicle is parked in the intended parking spot. This can be determined based on data from sensor 104 interaction with vehicles 132 and 134 (or other objects in the environment), which are parked close to the parking spot 130. In some examples, the functions and actions disclosed herein may be carried out responsive to (or only after) determining that the intended parking spot 130 is narrow such that one or more vehicle doors will be prevented from opening to the minimum open door angle.

Vehicle path 108 is shown and described herein as including a reverse maneuver into parking spot 130. However it should be noted that other paths may be possible as well, such as driving forward into a spot, performing a parallel parking maneuver, or any other path or movement that results in the vehicle being parked in a spot in which one or more doors may be prevented from fully opening.

Processor 110 may then begin executing the remote parking operation by causing vehicle 100 to travel along the determined path 108. During execution, processor 110 may monitor the relative position of vehicle 100 and/or objects in the environment (e.g., vehicles 132 and 134 in FIGS. 1A-1C).

Then, for each door determined to correspond to an occupant, or for which the operator wishes to have open prior to completion of the remote parking operation, the processor may determine whether the door can open to its corresponding minimum door angle or whether it is prevented from doing so by the environment around the vehicle. This may include determining the current angle to which the door can be opened, and monitoring a change in that value as the vehicle moves along path 108. For instance, when door 102 is fully opened, it may be opened to 80 degrees. The operator 120 of vehicle 100 may set the minimum open door angle to 45 degrees. As vehicle 100 travels along path 108 and reaches the position shown in FIG. 1B, processor 110 may determine that the open door angle would be less than 45 degrees if the vehicle continues along path 108.

Processor 110 may then pause execution of the remote parking operation responsive to determining via the sensors 104 that the door 102 is prevented from opening to the corresponding minimum door angle. In some examples, this may include pausing execution a short time before the door is prevented from opening to the minimum open door angle. Further, in some cases the minimum open door angle may be set to a slightly larger value (e.g., 46 degrees), such that the vehicle can pause execution of the remote parking operation when the door is prevented from opening to 46 degrees, yet is still able to open to 45 degrees as requested by the operator.

In some examples, there may be a threshold stopping time or stopping distance required by the vehicle to stop during execution of the remote parking operation. As such, processor 110 may be configured to pause execution of the remote parking operation responsive to determining that the door will be prevented from opening to the minimum open door angle after the threshold stopping time (e.g., the processor may add a threshold delay such that the vehicle stops moving before it reaches the position at which the door is prevented from opening to the minimum open door angle).

Pausing execution of the remote parking operation may include stopping the vehicle movement, and waiting for an additional command or input in order to continue execution.

In some examples, processor 110 may also provide an alert to the occupant that the remote parking operation has been paused, and that the occupant should exit the vehicle before the remote parking operation will continue. This gives the occupant the opportunity to exit the vehicle at the last possible moment during the remote parking operation before the door will be prevented from opening to the minimum open door angle. This provides the occupant with the least amount of time outside the vehicle exposed to bad weather or other adverse conditions.

Processor 110 may then continue the remote parking operation after receiving or responsive to receiving one or more inputs, such as from remote computing device 122. In some examples, the additional input may be from the detection of opening and closing of a door, such as the door corresponding to the minimum open door angle which caused the vehicle to pause execution of the remote parking operation. Alternatively, the input may come from the user interface 112. The operator may allow a rear passenger to exit the vehicle and close the door, and then input a command via the user interface 112 to continue execution of the remote parking operation.

In some examples, performing a remote parking operation may require continuous input from an operator. This may be done via the remote computing device 122, wherein operator 120 presses a button the remote computing device to cause the remote parking operation to begin or continue after pausing.

In the event only one door of the vehicle is indicated as corresponding to an occupied seat, processor 110 may finish the remote parking procedure after receiving the additional input. This is shown in FIG. 1C.

FIGS. 2A-2D illustrate a second scenario similar to that shown in FIGS. 1A-1C, however vehicle 200 in FIGS. 2A-2D includes an operator in the driver's seat and a passenger in the rear right seat. As such, when performing the remote parking operation there are two doors that have separate minimum open door angles, and the vehicle pauses and continues the operation two times.

Figure 2A:
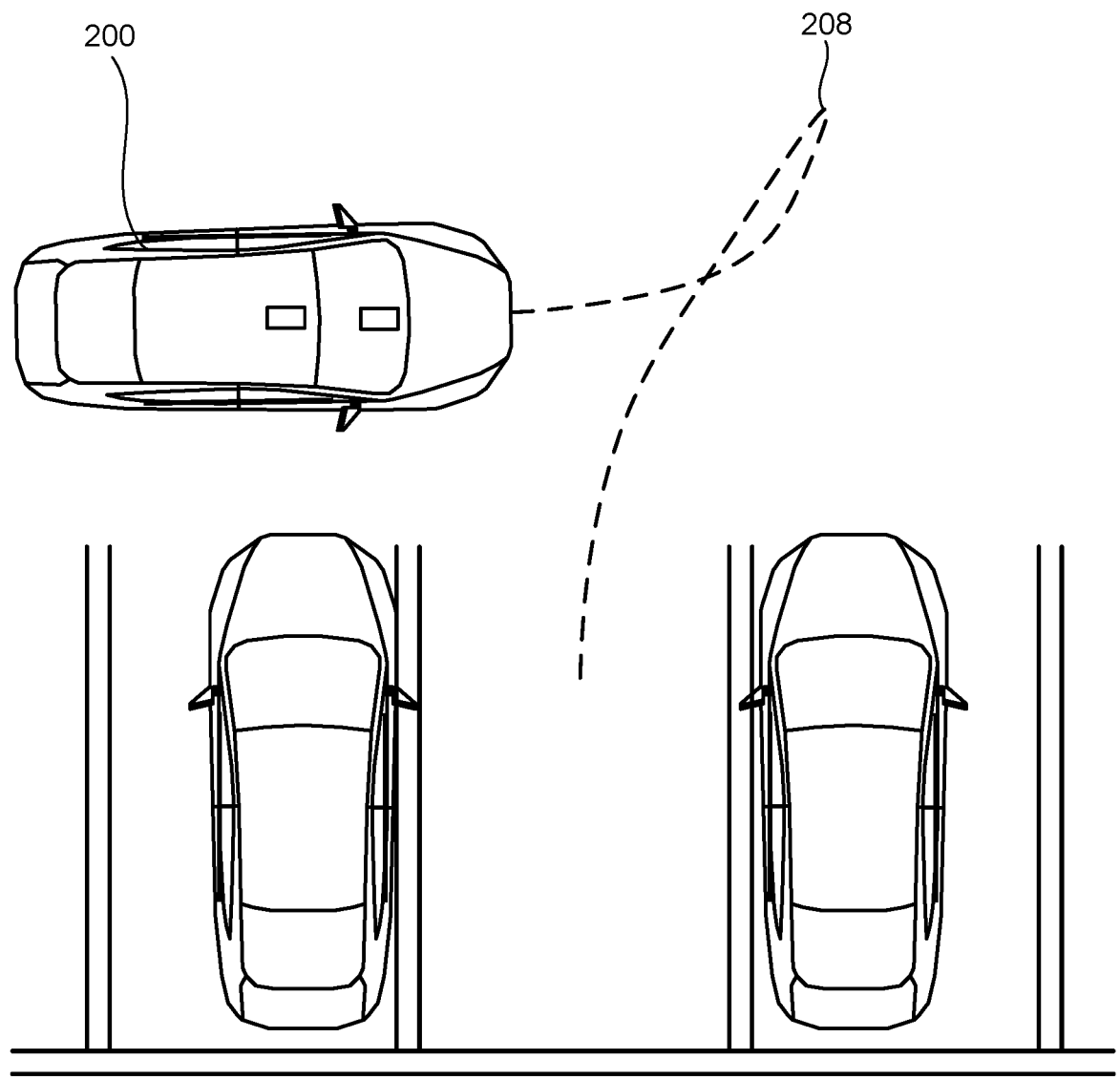
FIGS. 2A-2D illustrate another example vehicle having two occupants and performing a remote parking operation according to embodiments of the present disclosure.
Figure 2B:
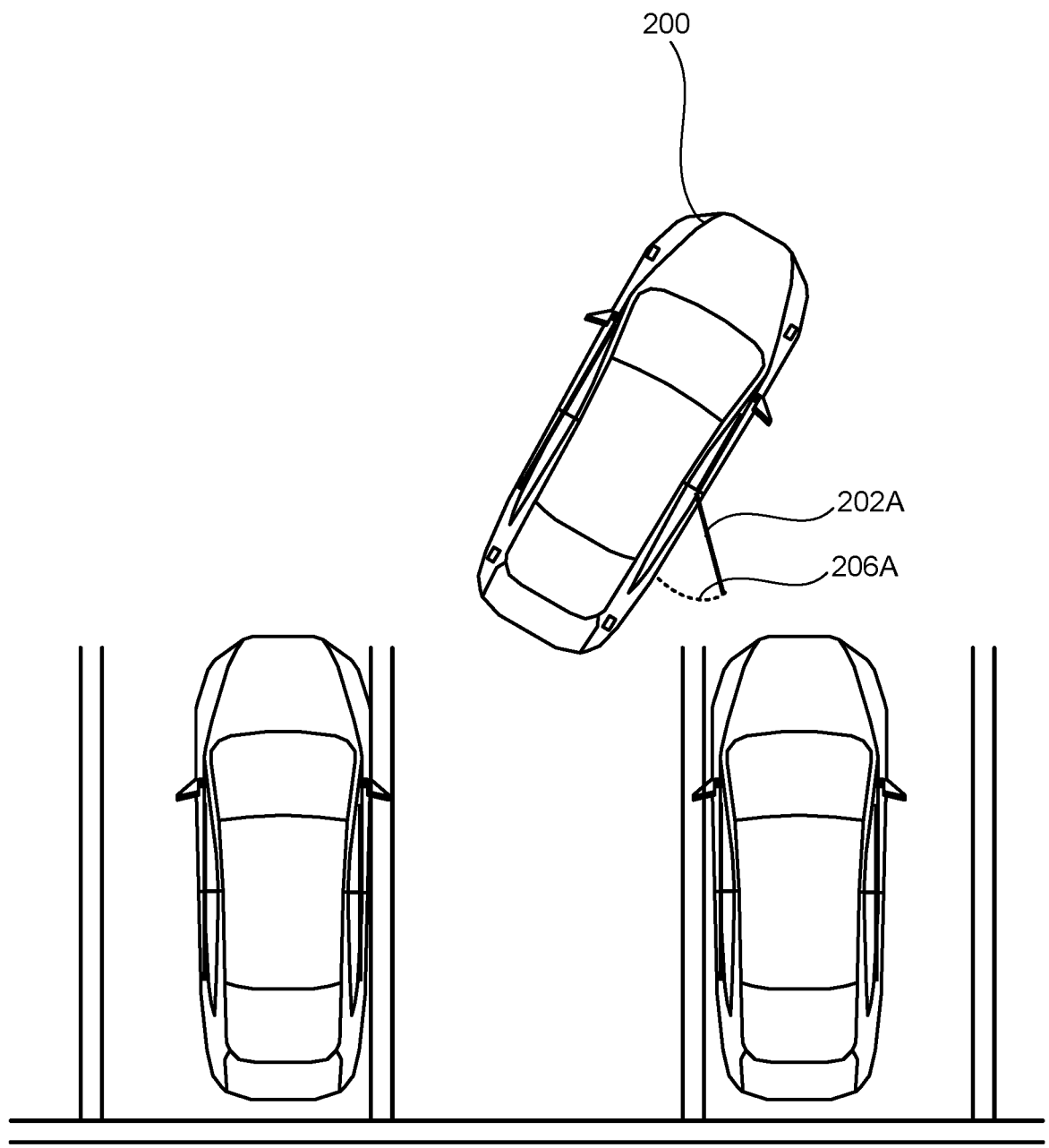

As can be seen in FIGS. 2A-D, the vehicle begins the remote parking operation by determining and following the vehicle path 208. The remote parking operation then continues until a processor of vehicle 200 determines that vehicle 200 should pause to allow first door 202A to open to the first minimum open door angle 206A. The passenger 220A may then exit the vehicle and close door 206A. This is shown in FIG. 2B.

Figure 2C:
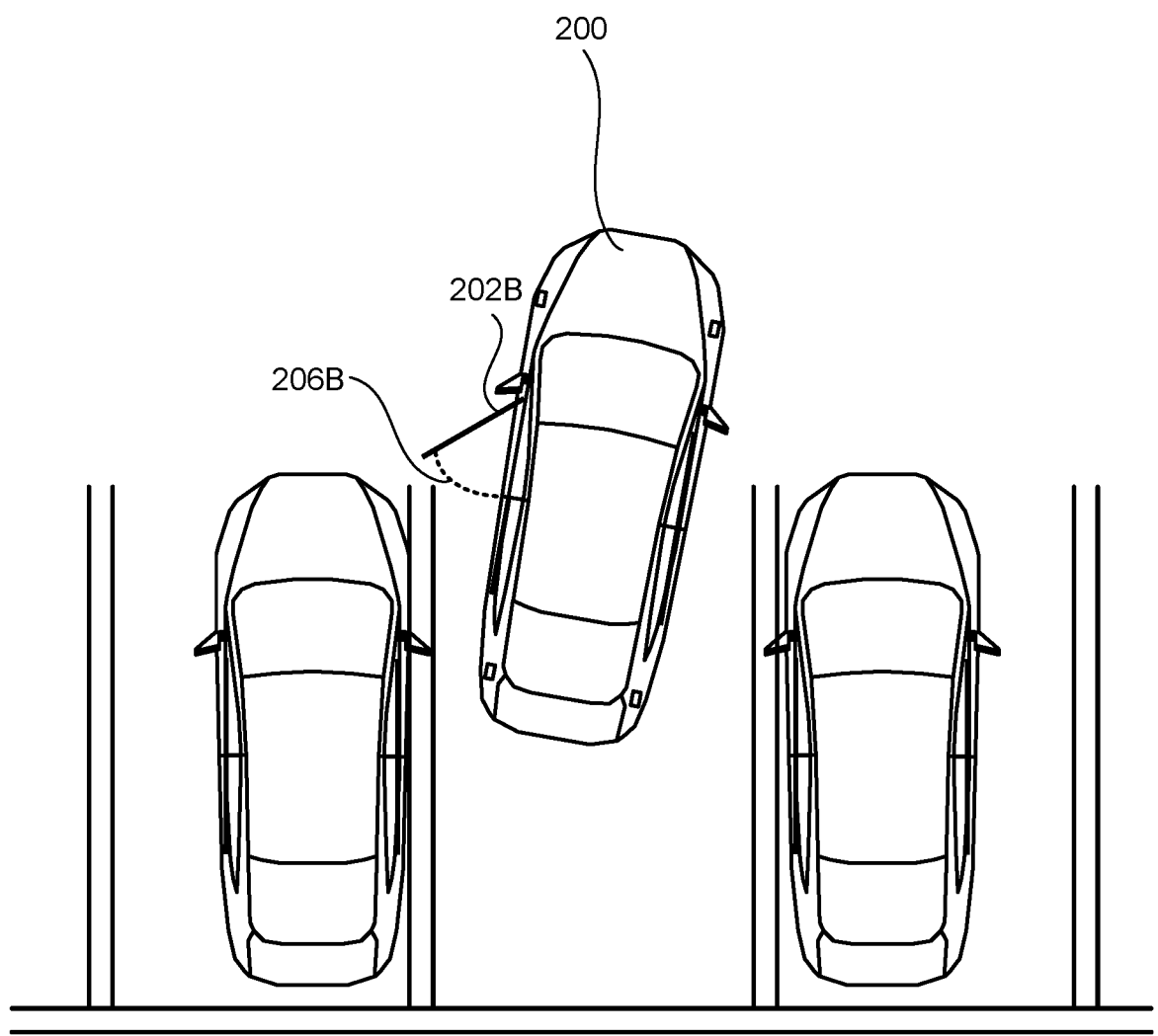
Figure 2D:
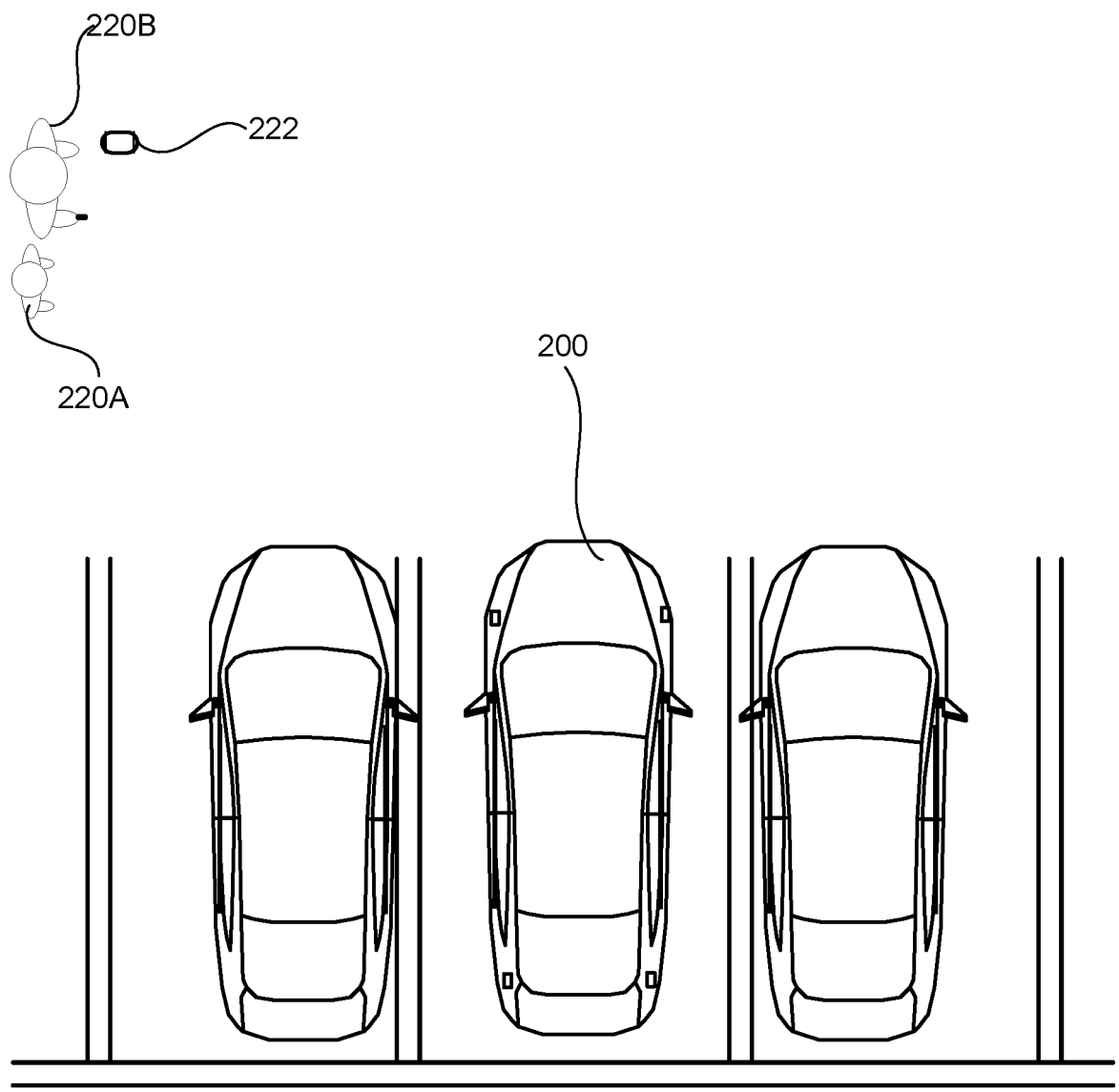

The remote parking operation may then continue as shown in FIG. 2C responsive to receiving an additional input (e.g., opening and closing of door 206A, input from a remote computing device of the operator, a user interface of vehicle 200, or some other source), until the processor of vehicle 200 determines that vehicle 200 should pause to allow second door 202B to open to the second minimum open door angle 206B. Operator 220B may then exit the vehicle and close door 206B. Operator 220B may also provide appropriate input via a remote computing device 222 to cause the vehicle 200 to continue the remote parking operation. Vehicle 200 may then continue the remote parking operation and finish as shown in FIG. 2D.

In some examples the position along paths 108 and/or 208 at which the vehicle stops and pauses the remote parking operation may be predetermined. For instance, the sensors 104 may be used to predict the position along the path 108 and/or 208 at which the vehicle may have to stop. These predicted positions may then be used to pause the operation of the remote parking operation. In these cases, the sensors 104 may or may not continuously monitor the position of the vehicle relative to the surroundings.

In some examples, during execution of the procedures disclosed herein, the operator may be provided with status updates as the vehicle proceeds to execute the remote parking operation. For instance, the operator may be provided information regarding the current angle to which one or more vehicle doors can open, such as a percentage the door(s) can be opened, a countdown to when the vehicle will pause execution to allow the occupant to exit, a scale of ease of exit based on one or more known characteristics of the occupant, corresponding minimum open door angle, and objects in the environment, and more.

Further, while examples are disclosed herein with reference to a remote parking operation, it should be understood that the concepts disclosed herein may be applicable to other vehicle operations, and any situation in which an operator may wish to perform an automatic assist or actively controlled maneuver for which the operator must leave the vehicle to complete the task remotely. This may include operations such as a remote trailer assist maneuver, in which the vehicle automatically moves to assist the operator in attaching a trailer.

Figure 3:
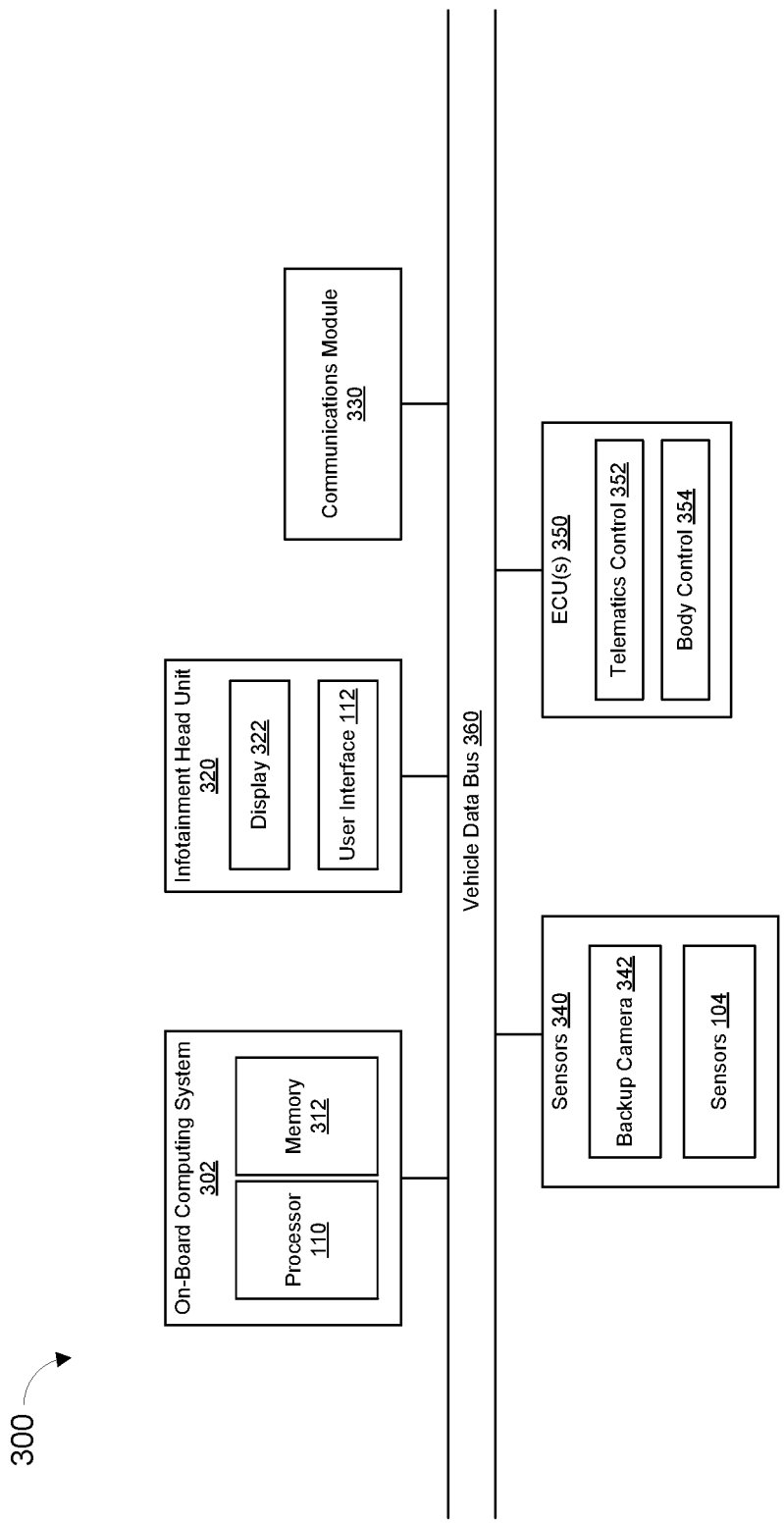
FIG. 3 illustrates a block diagram of electronic components of the vehicles of FIG. 1 and FIG. 2.

FIG. 3 illustrates an example block diagram 300 showing electronic components of vehicles 100 and 200, according to some embodiments. In the illustrated example, the electronic components 300 include an on-board computing system 302, an infotainment head unit 320, a communications module 330, sensors 340, electronic control unit(s) 350, and vehicle data bus 360.

The on-board computing system 202 may include a microcontroller unit, controller or processor 110 and memory 312. The processor 110 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 312 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 312 includes multiple kinds of memory, particularly volatile memory and non-volatile memory.

The memory 312 may be a non-transitory computer-readable media on which one or more sets of instructions, such as the software for operating the methods of the present disclosure, can be embedded. The instructions may embody one or more of the methods or logic as described herein. For example, the instructions reside completely, or at least partially, within any one or more of the memory 312, the computer-readable medium, and/or within the processor 110 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 320 may provide an interface between vehicle 100 and a user. The infotainment head unit 320 may include one or more input and/or output devices, such as display 322, and user interface 112, to receive input from and display information for the user(s). The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display (LCD), an organic light emitting diode (OLED) display, a flat panel display, a solid state display, etc.), and/or speakers. In the illustrated example, the infotainment head unit 320 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). In some examples the infotainment head unit 320 may share a processor with on-board computing system 302. Additionally, the infotainment head unit 320 may display the infotainment system on, for example, a center console display of vehicle 100.

Communications module 330 may include wired or wireless network interfaces to enable communication with one or more internal or external systems, devices, or networks. Communications module 330 may also include hardware (e.g., processors, memory, storage, etc.) and software to control the wired or wireless network interfaces. In the illustrated example, communications module 330 may include a Bluetooth® module, a GPS receiver, a dedicated short range communication (DSRC) module, an Ultra-Wide Band (UWB) communications module, a WLAN module, and/or a cellular modem, all electrically coupled to one or more respective antennas.

The cellular modem may include controllers for standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); and Wireless Gigabit (IEEE 802.11ad), etc.). The WLAN module may include one or more controllers for wireless local area networks such as a Wi-FI® controller (including IEEE 802.11 a/b/g/n/ac or others), a Bluetooth® controller (based on the Bluetooth® Core Specification maintained by the Bluetooth® Special Interest Group), and/or a ZigBee® controller (IEEE 802.15.4), and/or a Near Field Communication (NFC) controller, etc. Further, the internal and/or external network(s) may be public networks, such as the Internet; a private network, such as an intranet; or combinations thereof, and may utilize a variety of networking protocols now available or later developed including, but not limited to, TCP/IP-based networking protocols.

Communications module 330 may also include a wired or wireless interface to enable direct communication with an electronic device (such as remote computing device 122). An example DSRC module may include radio(s) and software to broadcast messages and to establish direct connections between vehicles and between vehicles and one or more other devices or systems. DSRC is a wireless communication protocol or system, mainly meant for transportation, operating in a 5.9 GHz spectrum band.

Sensors 340 may be arranged in and around vehicle 100 and/or 200 in any suitable fashion. Sensors 340 may include backup camera 342, and one or more sensors 104 such as those described above. In some examples, backup camera 232 and/or one or more of a RADAR and/or LIDAR may be used to determine a position, speed, and heading of vehicle 100 with respect to an external object, such as nearby cars or structures. This may assist in determining whether or not one or more doors are able to open to a minimum open door angle.

The ECUs 350 may monitor and control subsystems of vehicles 100 and 200. ECUs 350 may communicate and exchange information via vehicle data bus 360. Additionally, ECUs 350 may communicate properties (such as, status of the ECU 350, sensor readings, control state, error and diagnostic codes, etc.) to and/or receive requests from other ECUs 350. Some vehicles may have seventy or more ECUs 350 located in various locations around the vehicle communicatively coupled by vehicle data bus 360. ECUs 350 may be discrete sets of electronics that include their own circuit(s) (such as integrated circuits, microprocessors, memory, storage, etc.) and firmware, sensors, actuators, and/or mounting hardware. In the illustrated example, ECUs 350 may include the telematics control unit 352 and the body control unit 354.

The telematics control unit 352 may control tracking of the vehicle 100, for example, using data received by a GPS receiver, communication module 330, and/or one or more sensors 340. The body control unit 354 may control various subsystems of the vehicle. For example, the body control unit 354 may control a trunk latch, windows, power locks, power moon roof control, an immobilizer system, and/or power mirrors, etc.

Vehicle data bus 360 may include one or more data buses, in conjunction with a gateway module, that communicatively couple the on-board computing system 302, infotainment head unit 320, communications module 330, sensors 340, ECUs 350, and other devices or systems connected to the vehicle data bus 360. In some examples, vehicle data bus 360 may be implemented in accordance with the controller area network (CAN) bus protocol as defined by International Standards Organization (ISO) 11898-1. Alternatively, in some examples, vehicle data bus 360 may be a Media Oriented Systems Transport (MOST) bus, or a CAN flexible data (CAN-FD) bus (ISO 11898-7) or a combination of CAN and CAN-FD.

Figure 4:
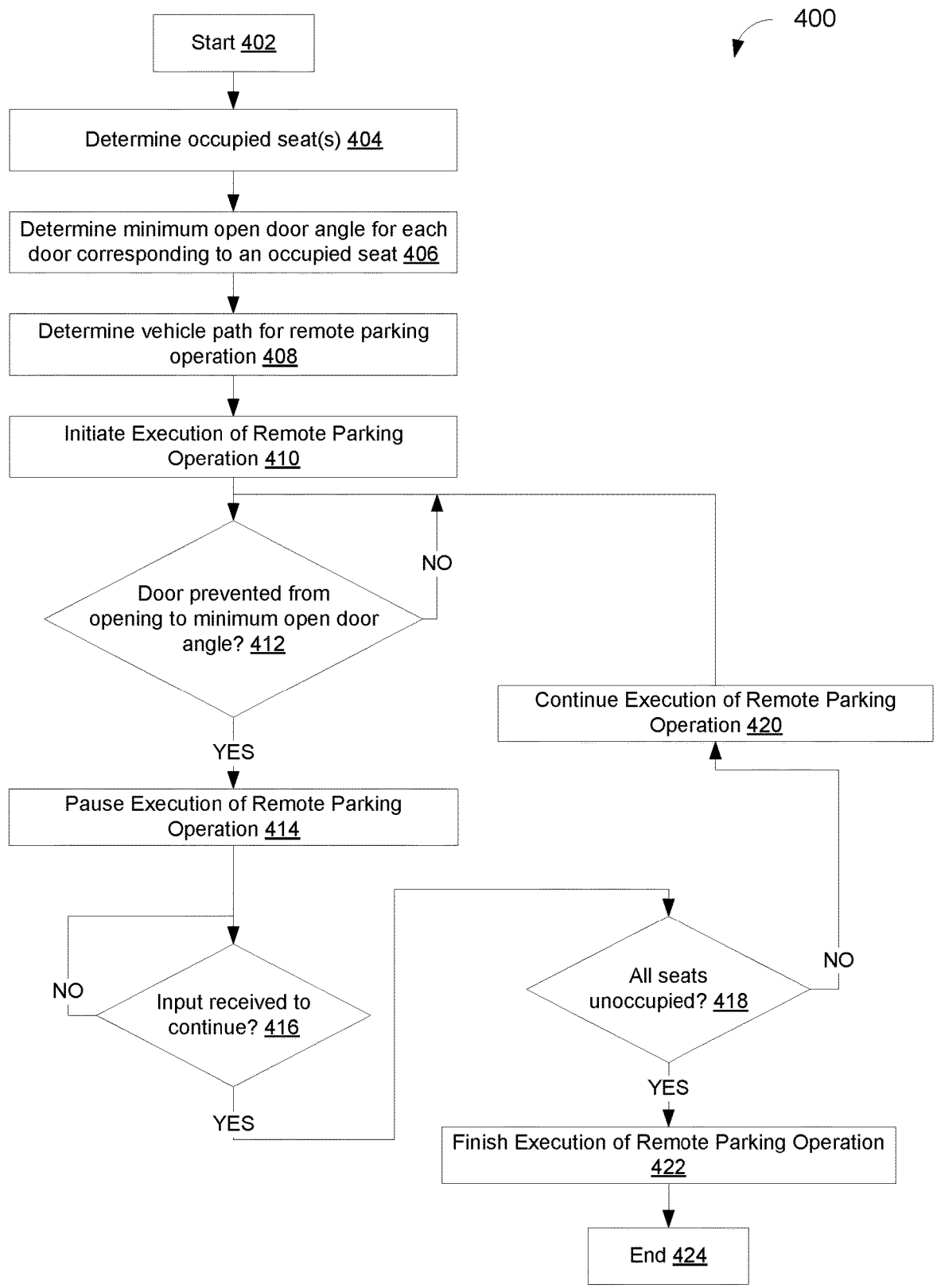
FIG. 4 illustrates a flowchart of an example method according to embodiments of the present disclosure.

FIG. 4 illustrates a flowchart of an example method 400 according to embodiments of the present disclosure. Method 400 may enable a vehicle occupant to maximize his or her time inside the vehicle during a remote parking operation, for example where there is adverse weather, by pausing execution of the remote parking operation at the last moment before the occupant is prevented from exiting the vehicle.

The flowchart of FIG. 4 is representative of machine readable instructions that are stored in memory (such as memory 212) and may include one or more programs which, when executed by a processor (such as processor 110) may cause vehicle 100 and/or 200 to carry out one or more functions described herein. While the example program is described with reference to the flowchart illustrated in FIG. 4, many other methods for carrying out the functions described herein may alternatively be used. For example, the order of execution of the blocks may be rearranged or performed in series or parallel with each other, blocks may be changed, eliminated, and/or combined to perform method 400. Further, because method 400 is disclosed in connection with the components of FIGS. 1-3, some functions of those components will not be described in detail below.

Method 400 may start at block 402. At block 404, method 400 may include determining one or more occupied seats of the vehicle. This can include receiving input at a user interface of the vehicle indicating which seats are occupied by a passenger. Alternatively, the operator may input one or more unoccupied seats where the vehicle operator wishes to have a door opened prior to completing the remote parking operation, so as to remove a large box or object from the seat. This may be referred to as "selected seats". In other examples, one or more vehicle sensors may automatically determine whether one or more seats are occupied. For example, the sensors may include pressure sensors coupled to the seats, and/or camera(s) configured to detect the presence of an occupant.

At block 406, method 400 may include determining a minimum open door angle for each door corresponding to an occupied seat determined in block 404. As noted above, the minimum open door angle may correspond to the angle at which the door opens to allow an occupant to comfortably enter and exit the vehicle. The minimum open door angle for a given door may be a default value, or may be set or changed by an occupant. In some examples, the minimum open door angle may correspond to a profile associated with a given occupant, and the vehicle may determine a minimum open door angle for a door corresponding to the occupant based on the profile of the occupant.

At block 408, method 400 may include determining a vehicle path for a remote parking operation. The vehicle path may be a path along which the vehicle is expected to intended to travel when executing the remote parking operation.

At block 410, method 400 may include initiating execution of the remote parking operation. During execution, the vehicle may control the movement of the vehicle by automatically causing the vehicle to accelerate, decelerate, turn, brake, and perform one or more other vehicle functions.

At block 412, method 400 may include determining whether a door (e.g., one or more of the doors determined at block 406) is prevented from opening to its corresponding open door angle. This may be done by making use of data gathered by one or more vehicle sensors, including cameras, ultrasonic sensors, radar, etc. As the remote parking operation is executed, the vehicle may travel along the determined vehicle path. Where there are objects in the environment, such as adjacent vehicles, the door may eventually be prevented from opening fully, and/or opening to the minimum open door angle.

If, during execution of the remote parking operation, the door(s) can still be opened to the minimum open door angle, method 400 may include waiting at block 412 for a change in status, and continuing to execute the remote parking operation.

However if a door is prevented from opening to its corresponding minimum open door angle, method 400 may proceed to block 414. At block 414, method 400 may include pausing execution of the remote parking operation. The vehicle may be controlled to stop movement, in order to allow the occupant corresponding to the door to open the door and exit the vehicle.

At block 416, method 400 may include determining whether input has been received to continue execution of the remote parking operation. The input may include determining that the door has been opened and closed, and/or that some time delay has passed, or that the area surrounding the vehicle is free from obstacles (such as the occupant who recently exited). In some examples, the input may be received from a remote computing device, such as an occupant's smart phone or other device used to control the remote parking operation.

If the input to continue has been received, method 400 may continue to block 418. At block 418, method 400 may include determining whether all seats determined to be occupied (at block 404) are now unoccupied. This can also include determining whether all doors that correspond to the occupied seats have been opened and closed. In other words, block 418 may include determining whether all occupants have had an opportunity to exit before their corresponding door is prevented from opening to its minimum open door angle.

If there are still one or more occupants in the vehicle, method 400 may proceed to block 420. AT block 420, method 400 may include continuing execution of the remote parking operation, and proceeding back to block 412. The process may then repeat for each additional door indicated by the occupants as corresponding to a door intended to be opened prior to completing the remote parking operation.

When all seats are unoccupied, or when all doors indicated by the driver have been afforded the opportunity to open and close to their minimum open door angle prior, method 400 may proceed to block 422. At block 422, method 400 may include finishing execution of the remote parking operation. This may include fully parking the vehicle in its intended parking spot, even if one or more doors are thereby prevented from opening to their corresponding minimum open door angle. Method 400 may then end at block 424.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
    a door;
    a sensor; and
    a processor configured to:
        determine, based on a user input received by a vehicle user interface, a minimum open door angle for an occupant to exit;
        determine a vehicle path for execution of a remote parking operation; and
        responsive to determining via the sensor during execution of the remote parking operation, and before the vehicle has reached a final parking position, that the door is prevented from opening to the minimum door angle, pause execution of the remote parking operation.

2. The vehicle of claim 1, wherein the processor is further configured to provide an alert indicating the occupant should exit the vehicle before the vehicle will proceed to the final parking position.

3. The vehicle of claim 1, wherein the processor is further configured to: determine that the door has opened and closed; and responsively resume execution of the remote parking operation.

4. The vehicle of claim 1, wherein the processor is further configured to:
    determine a first door and a second door corresponding to a first occupant and a second occupant;
    determine a first minimum open door angle for the first door, and a second minimum open door angle for the second door;
    responsive to determining via the sensor during execution of the remote parking operation that the first door is prevented from opening to the first minimum door angle, pause execution of the remote parking operation;
    resume execution of the remote parking operation responsive to determining that the first door has opened and closed;
    responsive to determining via the sensor during execution of the remote parking operation that the second door is prevented from opening to the second minimum door angle, pause execution of the remote parking operation; and
    resume execution of the remote parking operation responsive to determining that the second door has opened and closed.

5. The vehicle of claim 1, wherein the processor is further configured to continue execution of the remote parking operation responsive to receiving input from the occupant via a remote computing device.

6. The vehicle of claim 1, wherein the processor is further configured to receive input indicating which door corresponds to the occupant.

7. The vehicle of claim 1, wherein the processor is further configured to determine the minimum door angle based on a detected occupant identity.

8. The vehicle of claim 7, wherein the detected occupant identity is determined based on an occupant profile stored on a key FOB detected by the vehicle.

9. The vehicle of claim 1, wherein the processor is further configured to:
detect a current open door angle of the door; and
store the current open door angle in a vehicle memory as the minimum door angle.

10. A method comprising:
determining, based on a user input received by a vehicle user interface, a minimum open door angle of a door for an occupant to exit a vehicle;
determining a vehicle path for execution of a remote parking operation; and
responsive to determining via a sensor during execution of the remote parking operation, and before the vehicle has reached a final parking position, that the door is prevented from opening to the minimum open door angle, pausing execution of the remote parking operation.

11. The method of claim 10, further comprising providing an alert indicating the occupant should exit the vehicle before the vehicle will proceed to the final parking position.

12. The method of claim 10, further comprising:
determining that the door has opened and closed; and
responsively resuming execution of the remote parking operation.

13. The method of claim 10, further comprising:
determining a first door and a second door corresponding to a first occupant and a second occupant;
determining a first minimum open door angle for the first door, and a second minimum open door angle for the second door;
responsive to determining via the sensor during execution of the remote parking operation that the first door is prevented from opening to the first minimum door angle, pausing execution of the remote parking operation;
resuming execution of the remote parking operation responsive to determining that the first door has opened and closed;
responsive to determining via the sensor during execution of the remote parking operation that the second door is prevented from opening to the second minimum door angle, pausing execution of the remote parking operation; and
resuming execution of the remote parking operation responsive to determining that the second door has opened and closed.

14. The method of claim 10, further comprising resuming execution of the remote parking operation responsive to receiving input from the occupant via a remote computing device.

15. The method of claim 10, further comprising receiving input indicating which door corresponds to the occupant.

16. The method of claim 10, wherein the detected occupant identity is determined based on an occupant profile stored on a key FOB detected by the vehicle.

17. The method of claim 10, further comprising:
detecting a current open door angle of the door; and
storing the current open door angle in a vehicle memory as the minimum door angle.

18. The method of claim 10, further comprising determining the minimum door angle based on a detected occupant identity.

* * * * *